United States Patent
Childers et al.

(10) Patent No.: US 12,174,434 B2
(45) Date of Patent: *Dec. 24, 2024

(54) INTERCONNECT SYSTEM AND METHODS OF INSTALLING THE SAME

(71) Applicants: CORNING RESEARCH & DEVELOPMENT CORPORATION, Corning, NY (US); US CONEC LTD., Hickory, NC (US)

(72) Inventors: Darrell Childers, Hickory, NC (US); Mitchell Cloud, Hickory, NC (US); Craig Conrad, Hickory, NC (US); Terry Lee Cooke, Hickory, NC (US); Jason Higley, Hickory, NC (US); Sherrh Clint Reinhardt, Hickory, NC (US)

(73) Assignees: CORNING RESEARCH & DEVELOPMENT CORPORATION, Corning, NY (US); US CONEC LTD., Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,854

(22) Filed: Aug. 24, 2023

(65) Prior Publication Data
US 2023/0393351 A1    Dec. 7, 2023

Related U.S. Application Data

(63) Continuation of application No. 17/898,721, filed on Aug. 30, 2022, now Pat. No. 11,774,684, which is a
(Continued)

(51) Int. Cl.
*G02B 6/36*    (2006.01)
*G02B 6/38*    (2006.01)

(52) U.S. Cl.
CPC ......... *G02B 6/3885* (2013.01); *G02B 6/3825* (2013.01); *G02B 6/3893* (2013.01); *G02B 6/3897* (2013.01)

(58) Field of Classification Search
CPC .. G02B 6/3885; G02B 6/3825; G02B 6/3893; G02B 6/3897; G02B 6/4452; G02B 6/36
See application file for complete search history.

(56) References Cited

U.S. PATENT DOCUMENTS

| 6,513,989 B1 | 2/2003 | Bleck et al. |
| 6,766,095 B1 | 7/2004 | Bjorklund |

(Continued)

FOREIGN PATENT DOCUMENTS

| JP | 2019-066771 A | 4/2019 |
| WO | 2019/010291 A1 | 1/2019 |

(Continued)

OTHER PUBLICATIONS

FOA Reference Guide, "Fiber Optic Cable and Connector Color Codes", Available online at <https://www.thefoa.org/tech/ColCodes.htm>, 2021, 10 pages.

(Continued)

*Primary Examiner* — Jennifer Doan
(74) *Attorney, Agent, or Firm* — Adam R. Weeks

(57) ABSTRACT

An interconnect system is provided that involves pre-installing a connector housing an optical connector in an adapter and a ferrule of the same optical connector on a cable. The ferrule terminates one or more groups of optical fibers, and a ferrule push component is also pre-installed on the same group(s) of optical fibers. The connector housing is configured to receive and retain the ferrule and ferrule push component without being removed from the adapter to simultaneously form the optical connector and install the optical connector in the adapter. Embodiments such an (Continued)

interconnect system involving high fiber-count cables and related installation methods involving many optical connections are disclosed.

15 Claims, 10 Drawing Sheets

Related U.S. Application Data continuation of application No. 17/227,750, filed on Apr. 12, 2021, now Pat. No. 11,474,307.

(60) Provisional application No. 63/010,216, filed on Apr. 15, 2020.

(56) References Cited

U.S. PATENT DOCUMENTS

| | | | |
|---|---|---|---|
| 6,785,460 B2 | 8/2004 | De Jong et al. | |
| 7,296,935 B1 | 11/2007 | Childers et al. | |
| 7,609,925 B2 | 10/2009 | Gronvall et al. | |
| 8,727,638 B2 | 5/2014 | Lee et al. | |
| 8,920,043 B2 | 12/2014 | Iwaya et al. | |
| 9,057,845 B2 | 6/2015 | Szilagyi et al. | |
| 9,618,702 B2 | 4/2017 | Takano et al. | |
| 10,114,181 B2 * | 10/2018 | Lu | G02B 6/3879 |
| 10,215,926 B2 | 2/2019 | Ott | |
| 10,451,830 B2 | 10/2019 | Szumacher et al. | |
| 11,474,307 B2 | 10/2022 | Childers et al. | |
| 11,774,684 B2 * | 10/2023 | Childers | G02B 6/3897 |
| | | | 385/78 |
| 2007/0036503 A1 | 2/2007 | Solheid et al. | |
| 2009/0046981 A1 | 2/2009 | Margolin et al. | |
| 2014/0205244 A1 | 7/2014 | Bradley | |
| 2015/0355417 A1 | 12/2015 | Takano et al. | |
| 2018/0003910 A1 | 1/2018 | Menguy | |
| 2018/0188463 A1 | 7/2018 | Szumacher et al. | |
| 2019/0154923 A1 | 5/2019 | Flaig | |
| 2019/0250344 A1 | 8/2019 | Takano et al. | |
| 2021/0080669 A1 | 3/2021 | Cooke et al. | |

FOREIGN PATENT DOCUMENTS

| | | |
|---|---|---|
| WO | 2019/079425 A1 | 4/2019 |
| WO | 2019/079460 A1 | 4/2019 |

OTHER PUBLICATIONS

International Search Report and Written Opinion of the International Searching Authority; PCT/US2021/026306; dated Jul. 30, 2021; 13 pages; European Patent Office.
Outgoing—ISA/210—International Search Report Mailed on Jul. 30, 2021 for WO Application No. PCT/US21/026306.

* cited by examiner

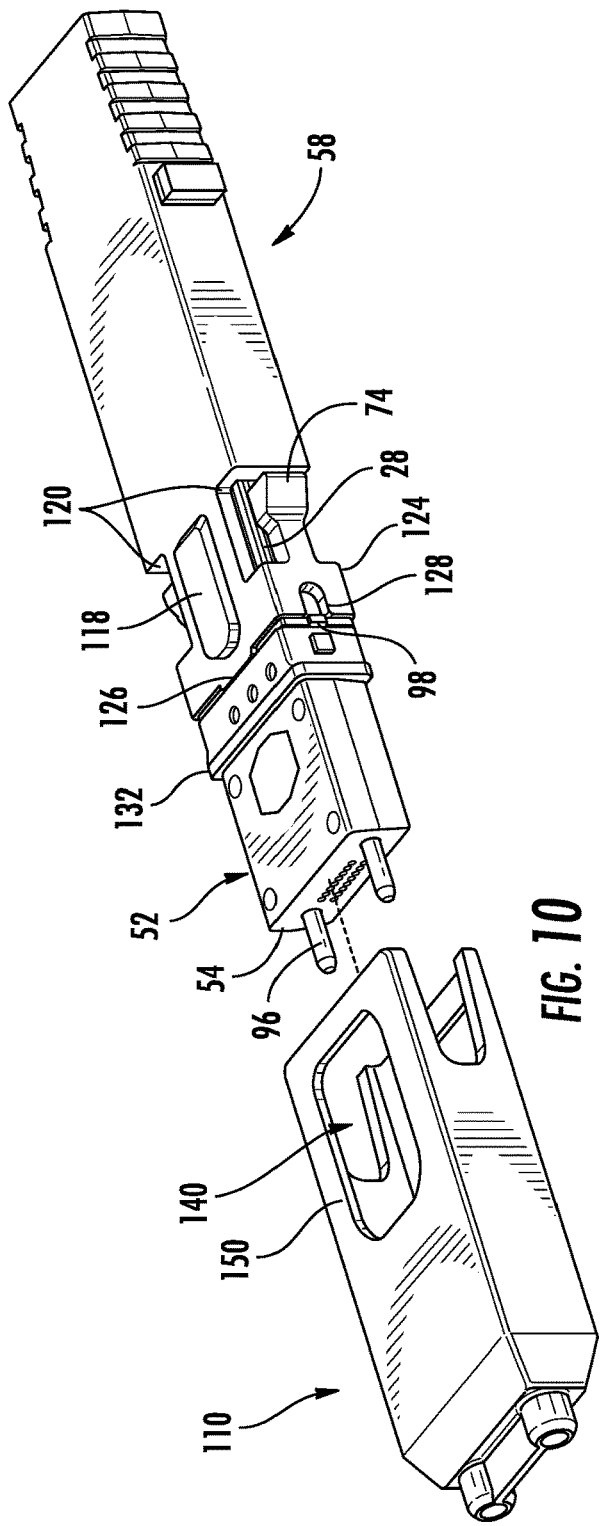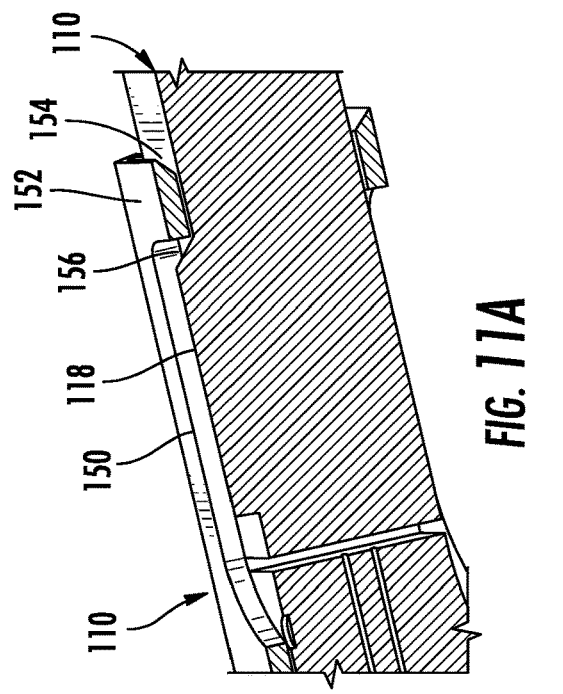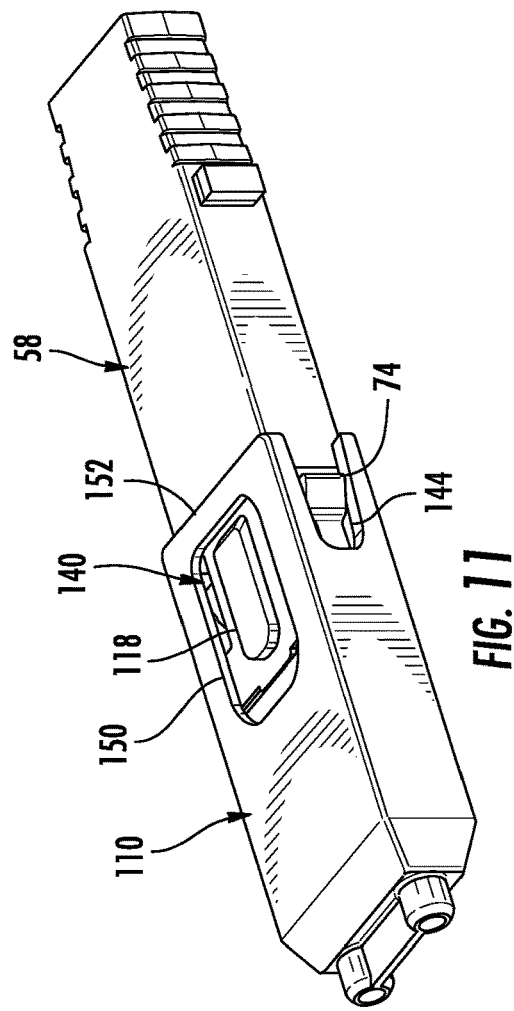

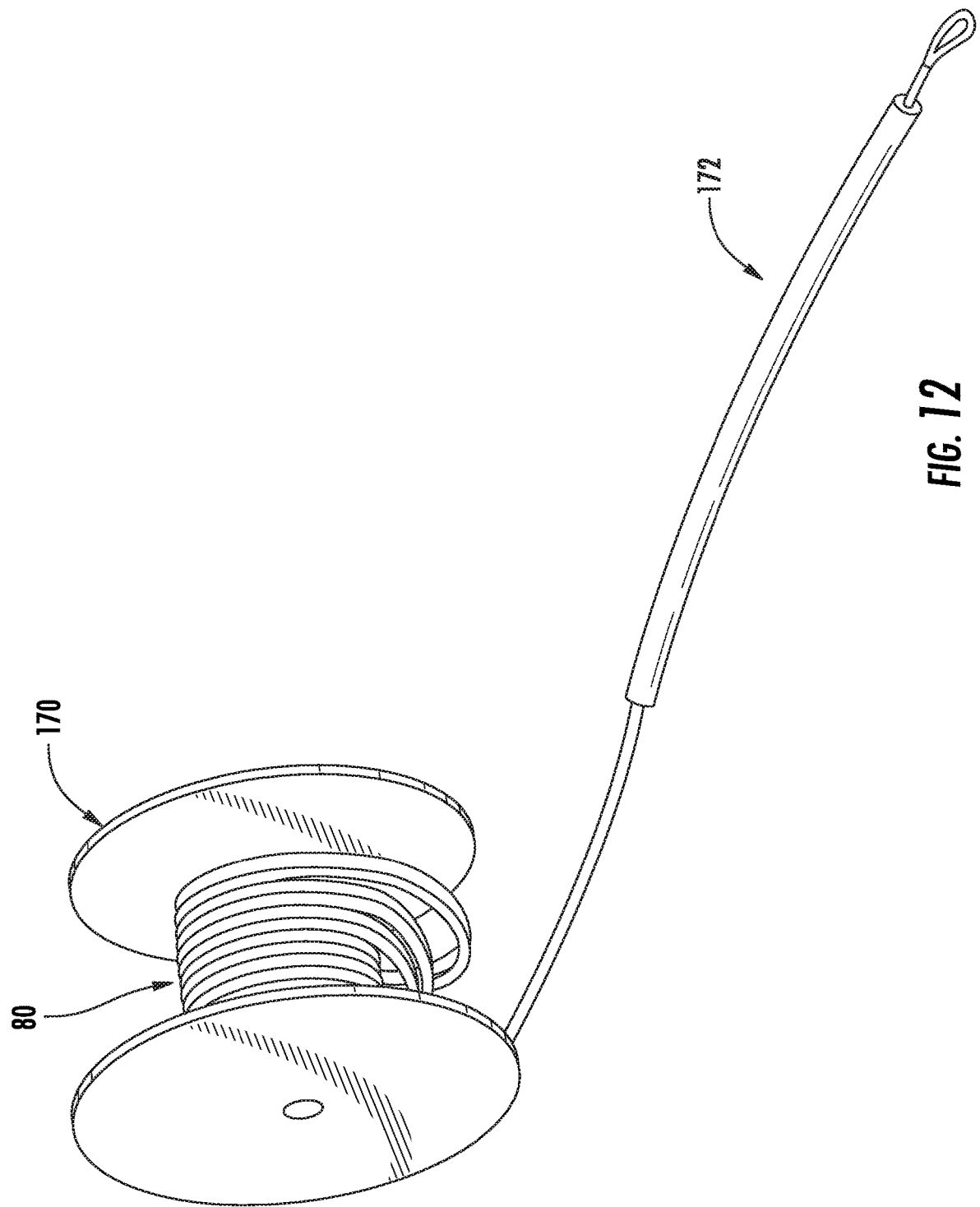

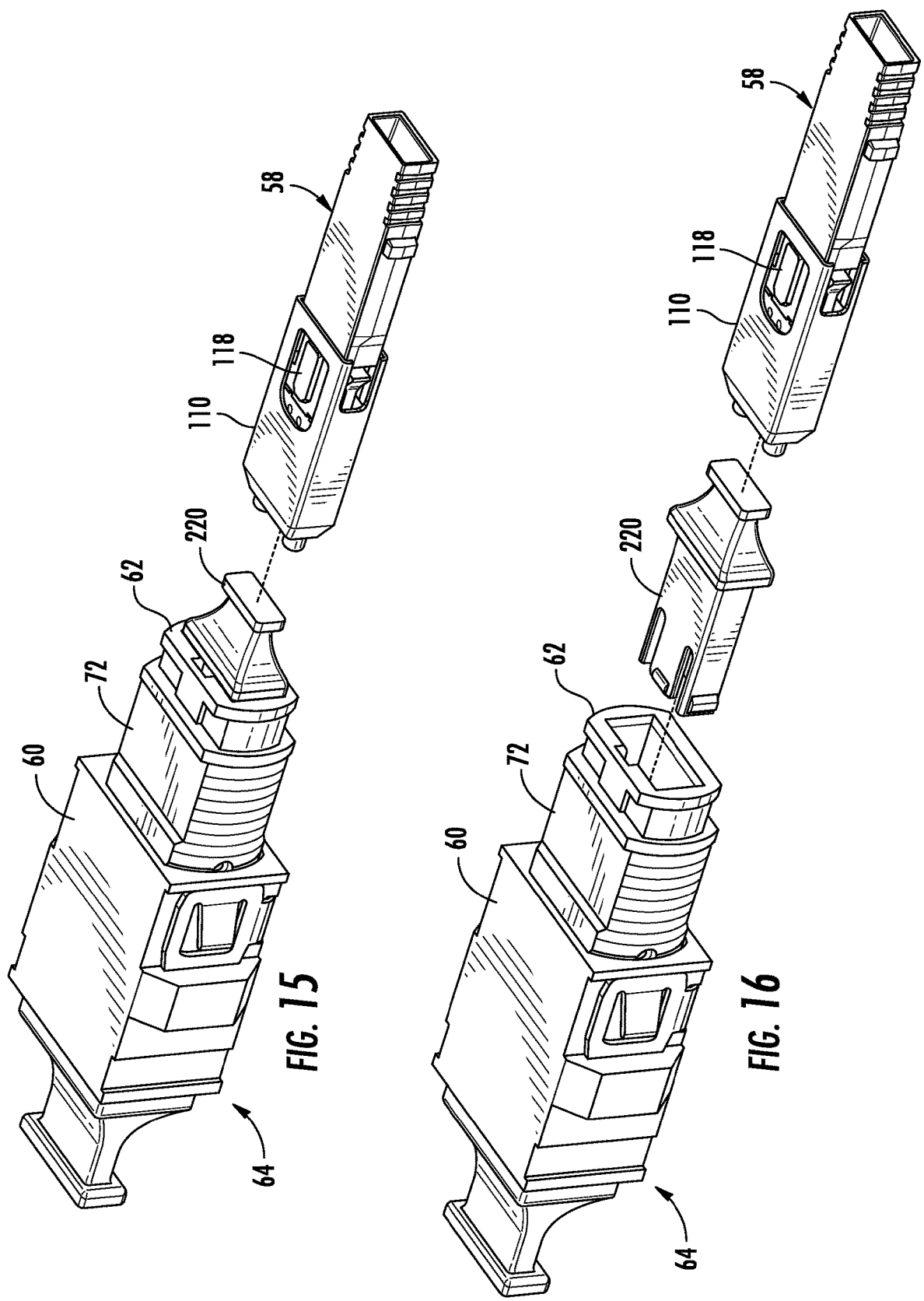

INTERCONNECT SYSTEM AND METHODS OF INSTALLING THE SAME

PRIORITY APPLICATION

This application is a continuation of U.S. application Ser. No. 17/898,721, filed on Aug. 30, 2022, now U.S. Pat. No. 11,774,684, which is a continuation of U.S. application Ser. No. 17/227,750, filed on Apr. 12, 2021, now U.S. Pat. No. 11,474,307, which claims the benefit of priority to U.S. Application No. 63/010,216, filed on Apr. 15, 2020, the content of which is relied upon and incorporated herein by reference in its entirety.

BACKGROUND

This disclosure relates generally to optical connectivity, and more particularly to an interconnect system and related methods that involve pre-installing at least one component of an optical connector in an adapter and another component of the same optical connector on a cable.

Large amounts of data and other information transmitted over the internet has led businesses and other organizations to develop large scale data centers for organizing, processing, storing, and/or disseminating large amounts of data. Data centers contain a wide range of IT and other communication equipment including, for example, servers, networking switches, routers, storage subsystems, etc. Data centers further include a large amount of cabling and equipment racks to organize and interconnect the communication equipment in the data center. For example, optical fiber cables and rack-mounted hardware to support optical connections are used extensively in data centers. Optical fibers can support very high bandwidths with lower signal loss compared to traditional data transmission mediums (e.g., copper wires).

The connections between communication equipment in large-scale data centers is typically not confined to a single building. Many modern data centers include multi-building campuses having, for example, one primary or main building and a number of auxiliary buildings in close proximity to the main building. All the buildings on the campus are interconnected by a local fiber optic network. More particularly, each of the auxiliary buildings are typically connected to the main building by one or more high fiber-count optical cables referred to as "trunk cables". Each trunk cable may include thousands of optical fibers. Indeed, fiber counts of 3,456 or higher are now common.

To provide optical connectivity within a building, the optical fibers of a trunk cable are typically spliced to optical fibers of indoor distribution cables. The splices may be stored and organized in a splice cabinet from which the indoor distribution cables extends. More specifically, the splice cabinet holds numerous splice trays that each receives a group of optical fibers from the trunk cable that have been spliced to a group of optical fibers associated with the indoor distribution cables. Fusion splicing is commonly used as the primary technique for splicing the two groups of optical fibers together before the splices are stored and organized in the splice trays. The indoor distribution cables exit the splice cabinet and extend to desired locations within the building, such as to designated rows of equipment racks. Connections to the IT equipment in the equipment racks are ultimately made by the indoor distribution cables or cables that are part of a structured cabling system for the building.

The amount of labor and time for connecting a trunk cable to the IT equipment in the main building on the data center campus is significant. In a typical installation process, it may take two technicians approximately two-weeks of time to fusion splice the optical fibers of a trunk cable to corresponding internal optical fibers of the main building. Additionally, fusion splicing is a labor-intensive method for connecting optical fibers that is typically performed under field conditions, as opposed to under more highly controlled factory conditions. Thus, the quality of the splicing and the attenuation of the optical signal through the splice may vary widely depending on the field technicians' skill and experience.

SUMMARY

Embodiments of interconnect systems are provided in this disclosure, and particularly interconnect systems that may be used in environments where a large number of optical connections is needed and where there are competing demands for space, such as in hyperscale data centers.

According to one embodiment, an interconnect system comprises a cable assembly and at least one adapter panel for managing interconnections. The cable assembly includes: a cable jacket; different groups of optical fibers carried within the cable jacket and extending beyond an end of the cable jacket; a plurality of ferrules each terminating one or more respective groups of the different groups of optical fibers; and a plurality of ferrule push components corresponding to the plurality of ferrules. Each ferrule push component of the plurality of ferrule push components is installed on the one or more respective groups of the optical fibers that are terminated by the corresponding ferrule. Each adapter panel of the at least one adapter panel includes a plurality of adapters. The interconnect system further comprises a plurality of connector housings each coupled to a respective adapter of the plurality of adapters independently from the cable assembly (i.e., without being part of the cable assembly when coupled to the respective adapter). The plurality of connector housings are configured to receive and retain the plurality of ferrules and the plurality of ferrule push components without being removed from the plurality of adapters.

Many embodiments are possible. Each ferrule of the plurality of ferrules may terminate a single group of the different groups of optical fibers, or each ferrule may terminate multiple groups of the different groups of optical fibers. Each group of the different groups of optical fibers may comprise an optical fiber ribbon, or each group of the different groups of optical fibers may include the respective optical fibers in a non-ribbon form.

In some embodiments, each ferrule of the plurality of ferrules includes a front end that defines an end face where the respective one or more groups of the different groups of optical fibers terminate, a back end opposite the front end, and a shoulder between the front end and the back end that defines a maximum height and a maximum width of the ferrule in a cross-sectional plane perpendicular to a longitudinal axis of the ferrule. Each ferrule push component of the plurality of ferrule push components has a maximum height and maximum width in a cross-sectional plane perpendicular to a longitudinal axis of the ferrule push that is substantially the same or less than the maximum height and maximum width of the corresponding ferrule.

In some embodiments, for each adapter panel of the at least one adapter panel, the plurality of adapters are arranged in a plurality of adapter rows, a plurality of adapter columns, or both a plurality of adapter rows and a plurality of adapter columns. The adapter panels may be located on a frame, tray, or other support member.

In some embodiments, the pre-terminated cable assembly further comprises: a plurality of subunits within the cable jacket, wherein each subunit includes several of the different groups of optical fibers and several of the ferrules, and wherein each row of the plurality of adapter rows or each column of the plurality of adapter columns includes a sufficient number of the adapters to correspond to the ferrules associated with any of the subunits. There may be a plurality of adapter panels for the plurality of subunits.

In some embodiments, the interconnect system further comprises a cabinet that includes a plurality of walls defining an interior volume. Each adapter panel of the at least one adapter panel has a storage position within the interior volume and is movable relative to the plurality of walls to a position at least partially outside the interior volume.

Methods of installing interconnect systems like the ones summarized above are also disclosed. According to one embodiment, such a method comprises: routing an end of the pre-terminated cable assembly that includes the plurality of ferrules from a remote location toward the at least one adapter panel; and installing the plurality of ferrules in the plurality of adapters by inserting the plurality of ferrule push components into the plurality of connector housings. The plurality of connector housings are coupled to the plurality of adapters before the installing step and remain coupled to the plurality of adapters during the installing step.

In some embodiments, the installing step results in the plurality of ferrules and the plurality of connector housings being coupled together to define a corresponding plurality of optical connectors that are installed in the plurality of adapters. The installing step may be performed without any tools, and wherein once the installing step is complete, the plurality of optical connectors are removable from the plurality of adapters without any tools.

In some embodiments, the routing step further comprises pulling the pre-terminated cable assembly through a duct using a pulling grip assembly that covers the plurality of ferrules and the plurality of ferrule push components. The routing step may also comprise routing the end of the pre-terminated assembly into a cabinet that includes the at least one adapter panel and thereafter removing the pulling grip to expose the plurality of ferrules, the plurality of ferrule push components, and portions of the different groups of optical fibers. Additionally, in some embodiments, the pulling grip is removed from the end of the pre-terminated cable assembly without a tool.

Additional features and advantages will be set out in the description that follows, and in part will be readily apparent to those skilled in the technical field of optical connectivity.

BRIEF DESCRIPTION OF THE DRAWINGS

The accompanying drawings are included to provide a further understanding, and are incorporated in and constitute a part of this specification. The drawings illustrate one or more embodiment(s) and, together with the description, serve to explain principles and operation of this disclosure. Features and attributes associated with any of the embodiments shown or described may be applied to other embodiments shown, described, or appreciated based on this disclosure.

FIG. 10 is a perspective view similar to FIG. 9, but illustrates the ferrule and the ferrule push of the pre-terminated sub-assembly in an assembled form; the dust cap remains spaced from these components.

FIG. 11 is a perspective view similar to FIG. 10, but illustrates the dust cap installed on the ferrule and the ferrule push.

FIG. 11A is a schematic cross-sectional view of a portion of the dust cap and the ferrule push to illustrate features to assist with travel of the dust cap over the ferrule push.

FIG. 12 is a perspective of the trunk cable of FIG. 5 stored on a cable reel and a pulling grip assembly ("pulling grip") covering an end portion of the trunk cable that includes pre-terminated sub-assemblies.

FIG. 15 is a perspective view of one pre-terminated sub-assembly with the dust cap (similar to FIG. 10) and an adapter assembly (similar to FIG. 1) intended to be coupled together during installation of an interconnect system, wherein the adapter assembly includes a dust cover pre-installed in the connector housing of the adapter assembly.

FIG. 16 is a perspective view similar to FIG. 15, but shows the dust cover removed from the connector housing.

DETAILED DESCRIPTION

Various embodiments will be clarified by examples in the description below. In general, the description relates to an interconnect system for a building that involves a fiber optic cable being pre-terminated with some components of optical connectors and at least one adapter panel having adapters pre-populated (i.e., pre-installed) with other components of those optical connectors. The components terminating the cable and the components pre-installed on the adapters can be combined during installation of the interconnect system to result in functionable optical connectors populating the adapter panel(s). The combining can occur without removing the components that are pre-installed on the adapters.

It will be apparent based on the description below that the present disclosure is more than a mere disaggregation of known components for later assembly. In other words, the present disclosure is not merely about taking known components of an optical connector that are normally assembled together in one location to terminate a fiber optic cable, and then separating them into two groups—one for installation on the cable at a first location, and another for installation on the cable at a second location. This disclosure instead takes advantage of new component designs that allow partial installation of an optical connector on a cable and partial installation of the same optical connector in an adapter. Complete installation of the optical connector on the cable and complete installation of the optical connector in the adapter take place simultaneously (i.e., both are completed at the same time). Thus, by the time the cable is terminated with the final optical connector, the optical connector is also installed in an adapter (e.g., of an adapter panel) and ready for mating with a complementary optical connector that may be received on an opposite side of the adapter.

Figure 1:
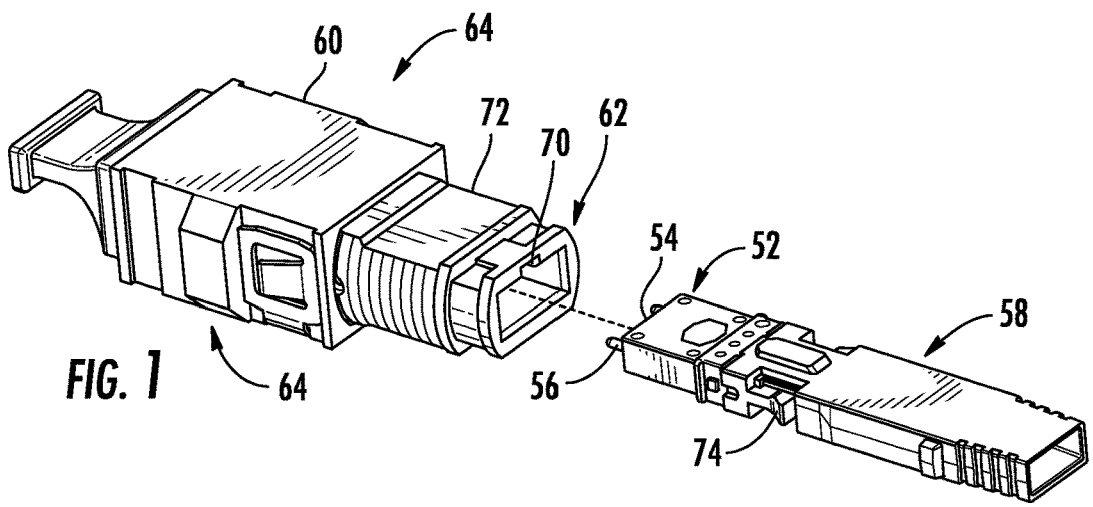
FIG. 1 is an exploded perspective view of one example of an adapter assembly and one example of a pre-terminated sub-assembly according to this disclosure, wherein the adapter assembly includes an MPO adapter and a connector housing pre-installed in the MPO adapter, and wherein the pre-terminated sub-assembly includes a ferrule and a ferrule push component.
Figure 2:
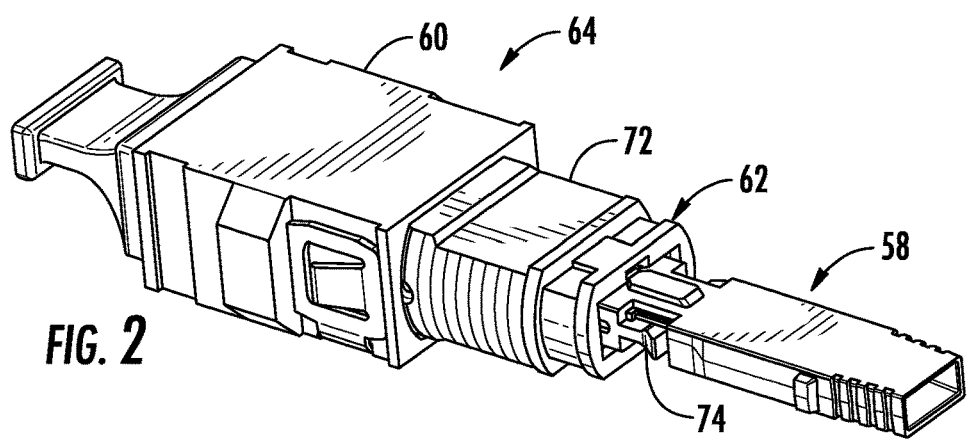
FIG. 2 is a perspective view showing the ferrule push of FIG. 1 being used to insert the ferrule into the connector housing that is pre-installed in the MPO adapter.
Figure 3:
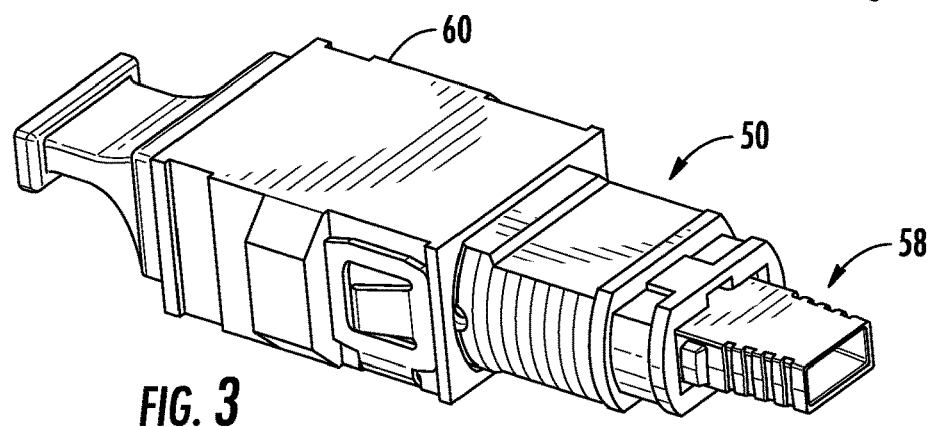
FIG. 3 is a perspective view showing the ferrule push of FIG. 1 fully inserted into the connector housing to form an optical connector that is coupled to the adapter.

The basic concept is shown in FIGS. 1-3, which illustrate an example involving components of a multi-fiber push-on/pull-off (MPO) optical connector (e.g., some according to IEC 61754-7-2: 2019 or TIA/EIA 604-5-F: 2019; see FIG. 3). A brief overview of the concept is provided here to facilitate discussion; additional details will be provided later in this disclosure. Optical fibers are not shown in FIGS. 1-3 to simplify the figures and this introductory discussion.

In general, optical connectors are designed to provide two primary functions: alignment of optical fibers for optical coupling, and mechanical retention to maintain that alignment. In an MPO connector and many other plug-type connectors, the primary component for the purpose of alignment is a ferrule. To this end, FIG. 1 illustrates a ferrule 52 that may be installed on the ends of optical fibers to terminate the optical fibers. The ferrule 52 is an MT-type ferrule having bores designed to receive and support optical fibers in a row or array (more than one bore). The optical fibers are secured to the ferrule 52 (e.g., using an adhesive) and are processed so that their ends are substantially flush with an end face 54 of the ferrule 52, which may or may not be angled relative to a plane that is perpendicular to a longitudinal axis of the ferrule 52. In this case, the presence of the guide pins 56 makes the ferrules male type ferrules, although this disclosure applies equally to female-type ferrules without guide pins. FIG. 1 also illustrates guide pins 56 protruding through the ferrule 52 and a ferrule push component 58 (or "ferrule push 58") located behind the ferrule 52. Both of these components may also be installed on the optical fibers that are terminated by the ferrule 52. Although the use of the guide pins 56 is well-known, the design and use of the ferrule push 58 is not. This component is what will primarily be described in further detail later in this Detailed Description section.

Figure 1A:
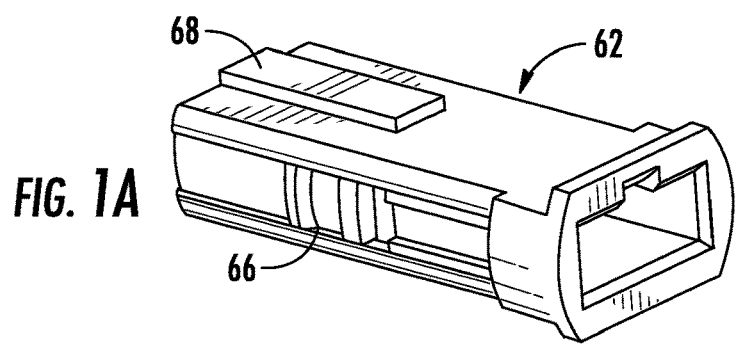
FIG. 1A is a perspective view of the connector housing of FIG. 1 in isolation.

In an MPO connector and many other plug-type connectors, the primary component for the purpose of retention is a connector housing (also referred to simply as a "housing", or as "connector body" or simply "body"). The housing receives the ferrule and includes a coupling mechanism, such as a latch feature for cooperating with a complementary latching feature of an adapter. In FIG. 1, a connector housing 62 of an MPO connector is shown as being pre-installed in an adapter 60 (also of the MPO-type, e.g. according to IEC 61754-7 or TIA/EIA 604-5) to form an adapter assembly 64. Although it cannot be seen it FIG. 1, the connector housing 62 is engaged by structure of the adapter 60 so as to be retained. FIG. 1A illustrates the connector housing 62 in isolation to better appreciate this aspect. The connector housing 62 includes latch recesses 66 (or "latch windows") on opposite sides that are engaged by adapter latch arms (not shown) of the adapter 60 when the connector housing 62 is installed in the adapter 60. The latch recesses 66 (or more specifically, portions of the latch recesses 66) define a mechanical reference datum upon which dimensions of the connector housing 62 can be consistently based for intermatability purposes. The same is true for the adapter latch arms. By defining certain dimension of the adapter 60 and the connector housing 62 based on their respective mechanical reference datums in a consistent manner, the associated optical connector 50 (FIG. 3; ferrule 52+connector housing 62, as discussed below) can mechanically intermate with other MPO-type optical connectors.

The structure of the connector housing 62 that has been described and that is shown in FIG. 1A, namely the exterior of the connector housing 62, may be the same or similar to known designs for MPO connectors. Indeed, these aspects are what partially define the associated optical connector 50 (FIG. 3) as being of the MPO-type. Thus, as is the case with other connector housings of MPO-type optical connectors, the connector housing 62 may also include a polarity key 68 on one side that must be aligned with a keyway in the adapter 60 to allow insertion into the adapter 60. The polarity key 68 therefore orients the connector housing 62 relative to the adapter 60, and may also serve as a stop feature to ultimately limit travel of the connector housing 62 in the direction of insertion. Also like known MPO optical connectors, a coupling sleeve 72 may be provided on the connector housing 62 to assist with coupling and uncoupling the connector housing 62 to/from the adapter 60. As is known, the coupling sleeve 72 is spring-biased relative to connector housing 62 to normally extend over the latch recesses 66 (and the adapter latch arms, if they are engaged with the latch recesses 66), but may be moved rearward relative to the connector housing 62 to no longer extend over the latch recesses 66, thereby releasing the adapter latch arms to release the optical connector 50 from the adapter 60. The connector housing 62 can be removed from the adapter 60 manually, i.e. without any tools (the coupling sleeve 72, if present, is part of an assembly with the connector housing 62 and not considered to be a separate tool).

Normally a ferrule and a connector housing of an optical connector are assembled together during the process of terminating the optical fibers with the optical connector. In other words, the final pre-terminated assembly includes both the ferrule and the connector housing. And since these components are the minimum components required to define an optical connector, the final pre-terminated assembly itself is considered to have an optical connector. This is not the case for the embodiment shown in FIG. 1. The ferrule 52 (element for optical alignment) is installed on optical fibers, but the connector housing 62 (element for mechanical retention) is not. There is not yet an assembly including the minimum attributes of an optical connector.

As shown in FIGS. 2 and 3, the ferrule push 58 may be used to advance the ferrule 52 into the connector housing 62 that has been pre-installed in the adapter 60. The ferrule 52 may be advanced until geometric features on the connector housing 62 engage and retain a portion of the ferrule push 58 in the end of the connector housing 62 that is outside the adapter 60. For example, the connector housing 62 may have features to engage ferrule push latches 74 that are provided on opposed sides of the ferrule push 58. By this point the ferrule 52 has been advanced such that the end face 54 protrudes slightly from the end of the connector housing 62 that is within the adapter 60 (note: an inner surface of the connector housing 62 may be designed to confront a front-facing surface on a flange/shoulder 132 and thereby prevent the ferrule 52 from falling out the end of the connector housing 62 during later use). With the ferrule 52 now retained with the connector housing 62 by way of the ferrule push 58 being coupled to the connector housing 62, the resulting assembly has the minimum attributes of an optical connector—an element for optical alignment (the ferrule 52) and an element for mechanical retention (the connector housing 62 and its defined mechanical reference datum(s)). In other words, an optical connector 50 can now be considered as having been formed without ever removing the connector housing 62 from the adapter 60. Simultaneously, installation of this optical connector 50 in the adapter 60 has been completed, as the optical connector 50 is ready for coupling with another MPO connector in the adapter 60.

The foregoing concept may be applied to any interconnect system that involves a fiber optic cable, an optical connector intended to terminate at least one fiber of the fiber optic cable, and an adapter intended to couple the optical connector to another optical connector. However, the concept may be especially advantageous for interconnect systems involving a large number of optical connections from a cable that includes a high fiber-count (e.g., 3,456 or more optical fibers), such as the trunk cables in hyperscale data centers. Despite being pre-terminated with some components of optical connectors according to this disclosure, the size of such a trunk cable assembly can remain within acceptable limits for being pulled through ducts and into buildings. Additionally, equipment to house the adapters 60 for the optical connectors 50 can be comparable in size or smaller than equipment used to store traditional optical connection to high fiber-count cables. As mentioned in the Background section above, those optical connections are traditionally in the form of fusion splices.

By having an interconnect system that uses a pre-terminated cable instead of one that requires splicing, the drawbacks associated with splicing can be avoided. There is no longer a need for installers to undertake the time-consuming process of fusion splicing potentially thousands of optical fibers to other optical fibers. Additionally, pre-terminated interconnect systems like the ones in this disclosure may require less skill to install and therefore be less prone to operator error. The ferrule push 58 of the interconnect system may also facilitate the installation process in other ways, as will be described in further detail.

To facilitate discussion and provide context, an exemplary environment and use for high fiber-count cables will first be described below. A description of an example high fiber-count, pre-terminated cable assembly will then follow, before going into further detail on the ferrule push 58 and related features that may be provided. Finally, example installation methods involving the high fiber-count, pre-terminated cable assembly will be discussed.

Example Environment (Data Center Cable Network)

Figure 4:
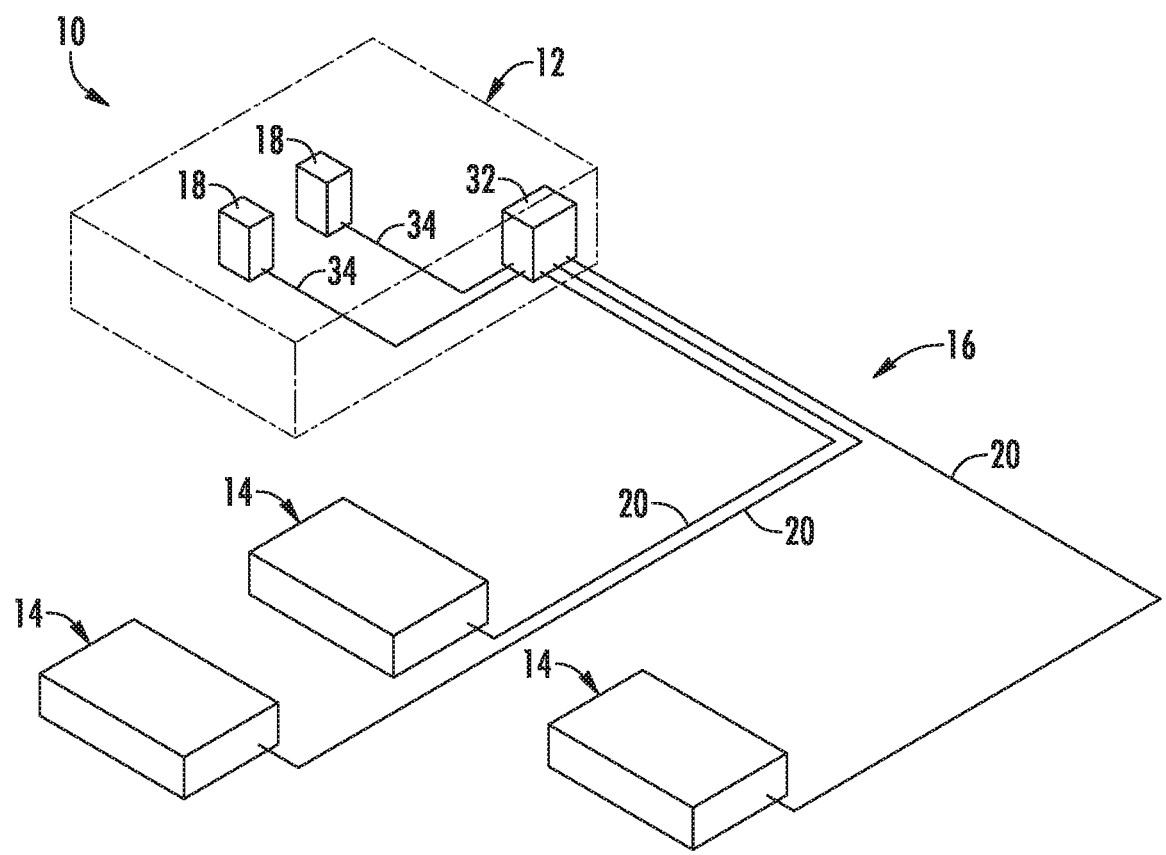
FIG. 4 is a schematic view of a data center campus interconnected according to an exemplary embodiment of this disclosure.

As illustrated in FIG. 4, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows communication equipment 18 in the main building 12 to communicate with various communication equipment (not shown) in the auxiliary buildings 14. In the exemplary embodiment shown, the local fiber optic network 16 includes trunk cables 20 extending between the main building 12 and each of the auxiliary buildings 14.

The trunk cables 20 may be similar to any of the cables described in International Patent Application Publication No. WO 2019/010291 A1 ("the '291 publication"), the disclosure of which is fully incorporated herein by reference. Thus, although a brief description of one of the trunk cables 20 is provided below to introduce aspects related to this disclosure, reference can be made to the '291 publication for an understanding of other aspects and variations.

Figure 5:
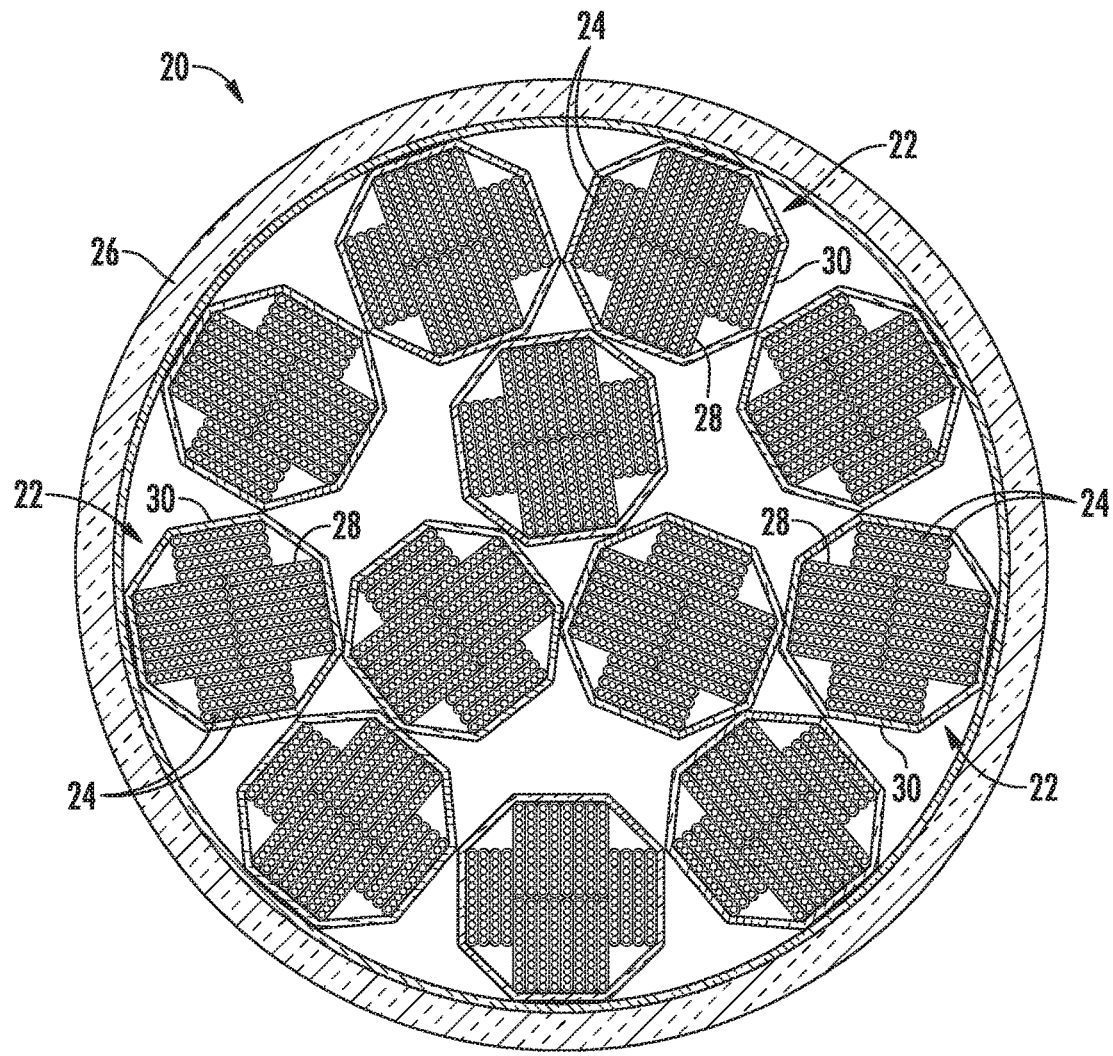
FIG. 5 is a cross-sectional view of one example of a trunk cable used in the data center campus of FIG. 4 to interconnect buildings.

As illustrated in FIG. 5, an example one of the trunk cables 20 generally includes a high fiber-count arrangement of optical fibers 24 (e.g., 3,456 or more optical fibers) for passing data and other information through the local fiber optic network 16. The trunk cable 20 includes a plurality of subunits 22, and each subunit 22 is configured to carry a pre-selected number of optical fibers 24. Although the trunk cable 20 is shown as including twelve subunits 22, the number of subunits 22 may be more or less than this number in alternative embodiments. The subunits 22 may be arranged within an outer protective sheath 26 (also referred to as "outer cable jacket 26" or simply "cable jacket 26" or "outer jacket 26"), as is generally known in the industry. As mentioned above, each of the subunits 22 is configured to carry a pre-selected number of optical fibers 24. By way of example and without limitation, each subunit 22 may be configured to carry 144 or 288 optical fibers 24. It should be recognized, however, that more or less optical fibers 24 may be carried by each of the subunits 22.

The optical fibers 24 in the subunits 22 may be arranged in different groups (i.e., distinct groupings, even though the groupings may have the same number of optical fibers 24). As an example, the optical fibers 24 may be configured as a plurality of optical fiber ribbons 28 ("ribbons 28"). Alternative embodiments may include the optical fibers 24 in a non-ribbon form (e.g., "loose" optical fibers). Each ribbon 28 includes a plurality of the optical fibers 24 arranged in a generally side-by-side manner (e.g., a linear array, as shown, or a rolled/folded array). Such ribbons are generally known and thus will not be described further in this disclosure. Each ribbon 28 may include, for example, eight, twelve, sixteen, or any other number of the optical fibers 24. The ribbons 28 of a subunit 22 may be arranged within a subunit sheath 30 ("subunit jacket 30"), which may be a thin layer of material that has been extruded over the ribbons 28.

In the example illustrated in FIG. 4, the trunk cables 20 from the auxiliary buildings 14 are routed to a distribution cabinet 32 (also referred to as "distribution enclosure 32") housed in the main building 12. In alternative embodiments, there may be multiple distribution cabinets 32 in the main building for receiving the trunk cables 20. Thus, there may be one or more distribution cabinets 32.

Figure 6:
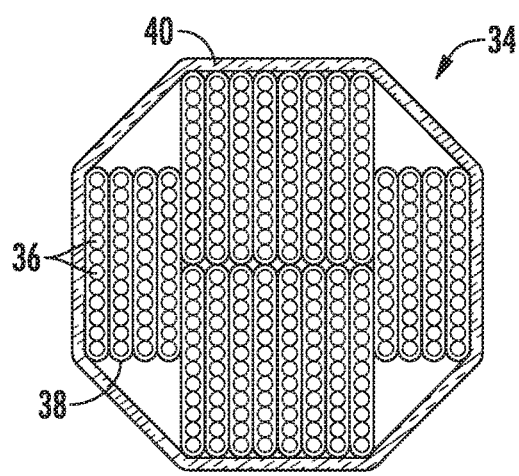
FIG. 6 is a cross-sectional view of one example of an indoor cable used within buildings of the data center campus shown in FIG. 4.

Within the main building 12, a plurality of indoor fiber optic cables 34 ("indoor cables 34") are routed between the communication equipment 18 and the one or more distribution cabinets 32. In an exemplary embodiment and as illustrated in FIG. 6, each of the indoor cables 34 may be configured similar to the subunits 22, at least in terms of fiber count and fiber groupings, and thereby be configured to carry a pre-selected number of optical fibers 36. By way of example and without limitation, each indoor cable 34 may be configured to carry 144 or 288 of the optical fibers 36. It should be recognized, however, that more or less optical fibers 36 may be carried by each of the indoor cables 34.

Similar to the optical fibers 24 of the subunits 22, the optical fibers 36 in the indoor cables 34 may be configured as a plurality of optical fiber ribbons 38 ("ribbons 38"). Thus, each ribbon 38 may include a plurality of optical fibers 36 arranged in a generally side-by-side manner (e.g., in a linear array or in a rolled/folded array). Again, such ribbons 38 are generally known in the industry and thus will not be described further in this disclosure. Each ribbon 38 may include, for example, eight, twelve, sixteen, or any other number of the optical fibers 36. The ribbons 38 of an indoor cable 34 may be arranged within an outer protective sheath 40 (also referred to as "cable outer jacket 40" or simply "cable jacket 40"), as is generally known in the industry.

Although only the interior of the main building 12 is schematically shown in FIG. 4 and discussed above, each of the auxiliary buildings 14 may house similar equipment for similar purposes. Thus, although not shown, each of the trunk cables 20 may be routed to one or more distribution cabinets 32 in one of the auxiliary buildings 14 in a manner similar to that described above. Furthermore, each of the auxiliary buildings 14 may include indoor cables 34 that extend between communication equipment 18 and the one or more distribution cabinets 32 of the auxiliary building 14.

Example Pre-Terminated Cable Assembly

At least one end of at least one of the trunk cables 20 extending between buildings 12, 14 may be pre-terminated in a manner consistent with the introductory discussion in this Detail Description section. Thus, the optical fibers 24 of each ribbon 28 may be terminated by a ferrule 52 in the manner described above with reference to FIGS. 1-3. Each ribbon 28 may be terminated with a respective ferrule 52, such as 12-fiber ribbons each being terminated with a respective 12-fiber MT ferrule. Alternatively, groups of two or more ribbons 28 may be terminated with the same ferrule 52, such as groups of two 12-fiber ribbons each being terminated with a respective 24-fiber MT ferrule. These terminations result in a pre-terminated trunk cable assembly ("pre-terminated trunk cable") because they occur at the manufacturing site of the pre-terminated trunk cable 80 rather than at the site of intended use. Thus, the word "pre-terminated" is used in this disclosure to refer to terminations that take place by the manufacturer of resulting cable assembly, prior to shipping to or deployment at a remote location/site of intended use (e.g., customer sites) ("the field").

Figure 7:
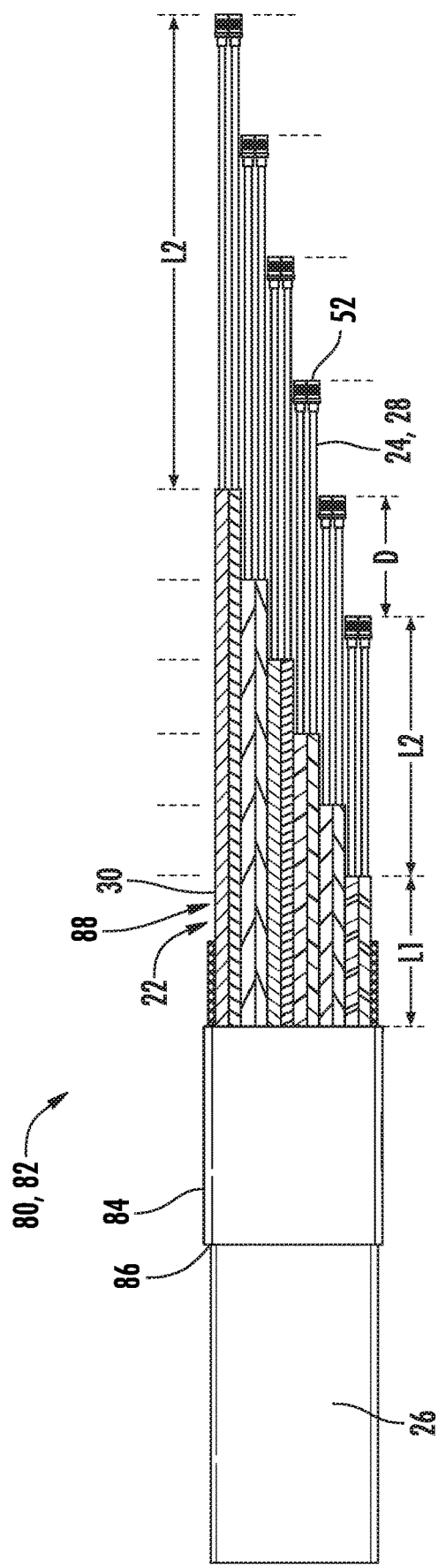
FIG. 7 is a schematic view of an end portion of the trunk cable of FIG. 5 having subunits pre-terminated with ferrules.

FIG. 7 schematically illustrates an end portion 82 of one of the trunk cables 20 pre-terminated with a plurality of the ferrules 52 to form a pre-terminated trunk cable 80. Ferrule push components (e.g., ferrule push 58) are not shown, but may be present as will be discussed below. The termination involves not only the installation of ferrules 52 and ferrule push components, but also preparing the end portion 82 of the trunk cable 20 for such installation. To this end, the pre-terminated trunk cable 80 includes a furcation body 84 associated with a first end 86 of the cable jacket 26. For example, the furcation body 84 may be installed on the first end 86 such that the cable jacket 26 ends within the furcation body 84. The furcation body 84 represents a "breakout", "branching", or "fanout" point on the trunk cable, as end sections 88 of the subunits 22 extend from the furcation body 84 and beyond the first end 86 of the cable jacket 26 so that the subunits 22 have more freedom to spread out.

Various types of furcation bodies are known. In the embodiment shown, the furcation body 84 comprises a shell positioned on or near the first end 86 of the cable jacket 26 and polymer material filling the shell. The polymer material may be a cured adhesive, such as epoxy, so that the shell is secured to the cable jacket 26 and the subunit jackets 30. In alternative embodiments, the furcation body 84 may have a different construction and/or be secured to the trunk cable 20 in a different manner.

Figure 8:
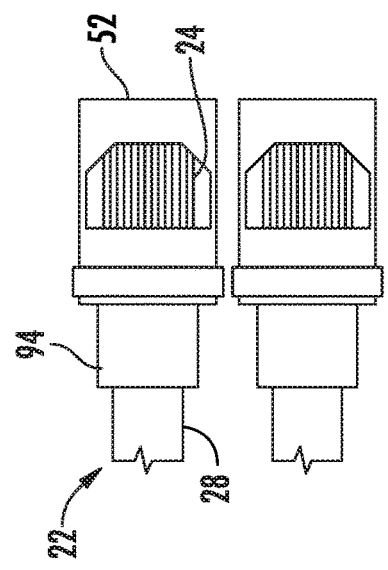
FIG. 8 is a close-up schematic view of the ferrules associated with two of the subunits in FIG. 7.

In the embodiment shown in FIG. 7, the end sections 88 of the subunits 22 each include the associated subunit jacket 30 extending a certain length from the furcation body 84, and the associated group of optical fibers 24 extending a certain length from (i.e., beyond) the associated subunit jacket 30. For convenience, only a representative ribbon 28 and representative ferrule 52 is schematically shown for each subunit 22 in FIG. 7. A close-up of the representative ribbon 28 and representative ferrule 52 for two of the subunits 22 is schematically shown in FIG. 8. As mentioned above, each subunit 22 may actually include a plurality of ribbons 28, such as twelve ribbons 28 that each have twelve optical fibers 24 (144 fiber count per subunit 22), twenty-four ribbons 28 that each have twelve optical fibers 24 (288 fiber count per subunit 22), or the like.

Referring back to FIG. 7, the end sections 88 of the subunits 22 are grouped in pairs, with the end sections 88 of a given pair having substantially the same length. For example, the lowermost pair in FIG. 7 includes the subunit jackets 30 extending a length L1 from the furcation body 84, and the optical fibers 24 extending a length L2 from the subunit jacket 30. The total length of the end section 88 (i.e., L1+L2) may be referred to as the "leg length". The different pairs of end sections 88 have different leg lengths to provide a staggered arrangement of the ferrules 52. This staggering allows the pre-terminated trunk cable 80 to be placed within a smaller pulling grip/sock (compared to if there were no staggering), and therefore, fit within smaller ducts or the like. These aspects will be described in connection with example uses of the pre-terminated trunk cable 80 further below.

In FIG. 7, each successive group of end sections 88 has a leg length that is a distance D longer than the leg length of the preceding group. Thus, each group of end sections 88 is D longer than the previous group such that there is substantially uniform (i.e., uniform or intended to be uniform) staggering of the different groups of the ferrules 52. In alternative embodiments, the staggering may be non-uniform. The different leg lengths may be due to the subunit jackets 30 extending further from the furcation body 84. Thus, the length L2 that the optical fibers 24 extend beyond the corresponding subunit jacket 30 may remain substantially the same (i.e., the same or intended to be the same). A consistent length of exposed ribbons 28 may allow consistent processing by the manufacturer of the pre-terminated trunk cable 80 when terminating the optical fibers 24. In other words, termination processes may be based on a certain exposed length of each ribbon 28 (e.g., for fixtures, stripping equipment, etc.). When that length is provided, the termination processes may be performed in a repeatable manner. Alternative embodiments without consistent lengths of exposed ribbons 28 are nevertheless within the scope of this disclosure as well.

Figure 9:
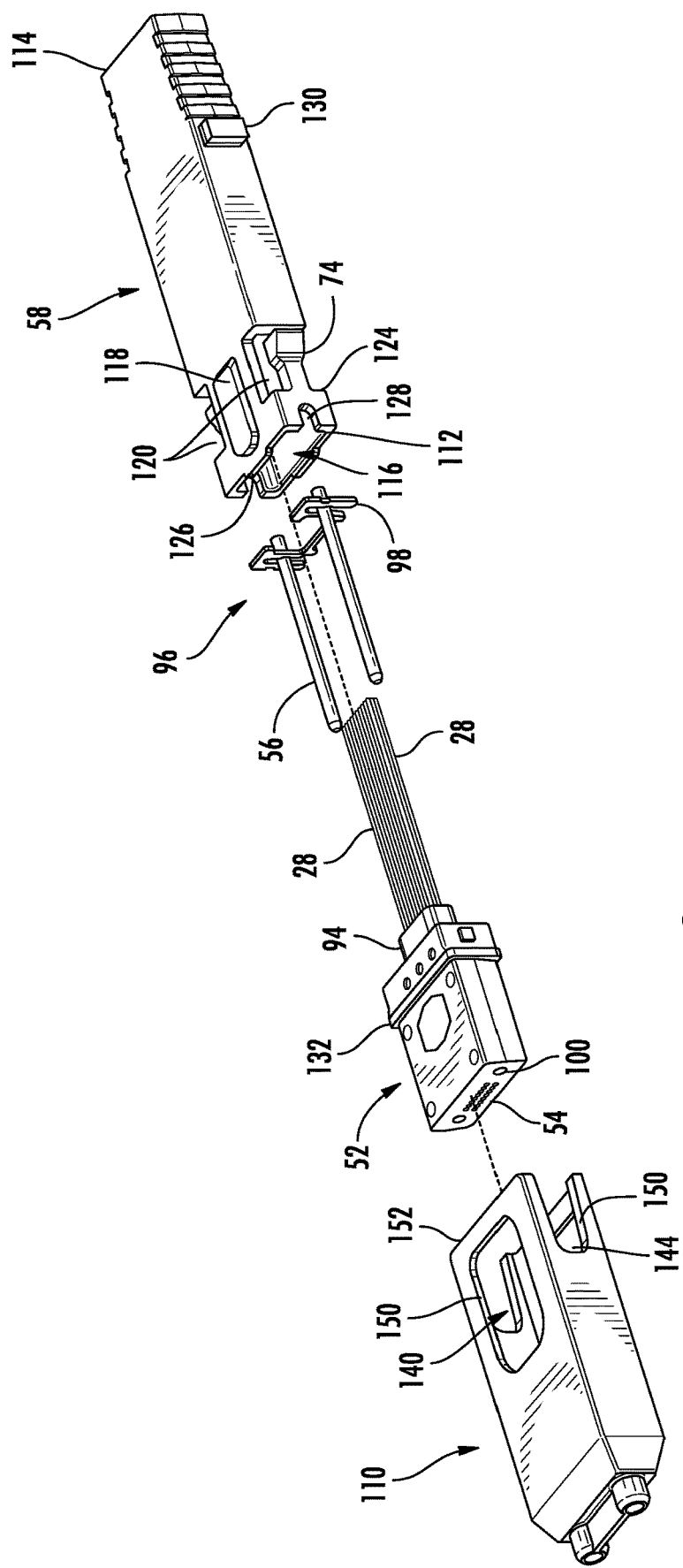
FIG. 9 is an exploded perspective view of the pre-terminated sub-assembly shown in FIG. 1 and a dust cap for that pre-terminated sub-assembly.

In addition to being pre-terminated with the ferrules 52, the trunk cable 20 may be pre-terminated with a plurality of the ferrule push components 58 (FIGS. 1-3) described above. FIGS. 7 and 8 do not illustrate the ferrule push components 58 and other, optional components to simplify the drawings. Instead, reference can be made to FIGS. 9-11, which illustrate a representative termination. In FIG. 9, two ribbons 28 are shown as being terminated by a ferrule 52 in the form of a 24-fiber, MT ferrule. Only a short length of each ribbon 28 is shown for convenience; to ease understanding of other components shown in the drawings. It will be appreciated that the ribbons 28 extend rearwardly from the ferrule 52 and the ferrule push component 58, and ultimately into a subunit jacket 30, as schematically shown in FIG. 7 and discussed above. A ferrule boot 94 received in a rear portion of the ferrule 52 supports the optical fibers 24 as they extend from the ferrule 52. Because the termination of optical fibers with ferrules and the use of ferrule boots are generally known, these aspects will not be described in further detail.

FIG. 9 also illustrates a guide pin assembly 96 behind the ferrule 52. The guide pin assembly 96 includes the guide pins 56 secured to a pin keeper 98. The guide pins 56 are intended to extend through pin holes 100 in the ferrule and project beyond the end face 54, while the pin keeper 98 is intended to rest against a back surface of the ferrule 52 and prevent the guide pins 56 from being removed. It may be possible, however, to actuate the pin keeper 98 (e.g., by squeezing or expanding tabs) to allow intentional removal of the guide pins 56 from the front of the ferrule 52. Like the ferrule 52 and the ferrule boot 94, the use of guide pin assemblies is generally known such that this aspect will also not be described in further detail. Indeed, the guide pin assembly 96 is an optional component in any event.

More pertinent to this disclosure is the ferrule push 58 shown in FIG. 9 and an optional dust cap 110. The ferrule push 58 is a generally elongate structure with a front end 112, a back end 114, and an internal cavity 116 extending between the front end 112 and the back end 114. The internal cavity 116 allows the ferrule push 58 to be received over the ribbons 28, which may be done prior to terminating the ribbons 28 with the ferrule 52. The ferrule push 58 in the embodiment shown is designed to be installed on the ribbons 28 in a particular orientation. Specifically, one side of the ferrule push includes a polarity key 118 intended to be oriented on a particular side of the ribbons 28. The ribbons 28 are considered to have sides in the sense that the optical fibers 24 have a predefined order. Individual optical fibers 24 of a ribbon 28 have different colors, and the colors are arranged in a pre-defined order that is well-known in the telecommunications industry. Reference can be made to textbooks or standards like TIA/EIA 598-B: 2001, for example. The first optical fiber 24 of a ribbon 28 has a blue color, while the twelfth optical fiber 24 has an aqua color. On one side of the ribbon 28 the optical fibers 24 will appear in the normal order of 1 to 12 (blue to aqua), while on the other side of the ribbon 28 the optical fibers 24 will appear in reverse order, i.e. 12 to 1 (aqua to blue).

Advantageously, the ferrule push 58 includes slots or openings 120 on opposed sides to provide visibility into the internal cavity 116. The openings 120 allow at least the first and last optical fibers 24 in the ribbons 28 to be seen by a technician. Thus, when placing the ferrule push 58 on the ribbons 28, the technician can verify that the polarity key 118 is on the desired side of the ribbons 28 (i.e., the side corresponding to the normal order or reverse order of the optical fibers 24, whichever is desired). Additionally, a window (not shown) on the top or bottom of the ferrule push 58 may be provided to view the correct order of the optical fibers 24. The polarity key 118 not only orients the ferrule push 58 relative to the ribbons 28, but also serves to orient the ferrule push 58 relative to the connector housing 62 when forming the optical connector 50. Referring back to FIGS. 1-3, it can be seen how the connector housing 62 includes an internal keyway 70 on one surface so that the ferrule push 58 can only be inserted into the connector housing 62 in a single orientation. Thus, ultimately, the ribbons 28 are oriented relative to the adapter 60.

As shown in FIG. 9, the openings 120 on the sides of the ferrule push 58 are spaced from the front end 112. A front portion 124 of the ferrule push 58 extending front the front end 112 to the openings 120 is shaped to receive the ferrule boot 94 in the internal cavity 116. As shown in FIG. 10, after terminating the optical fibers 24 with the ferrule 52, the ferrule push 58 may be pushed forward against the back of the ferrule 52. This may occur after pushing the pin keeper 98 against the back of the ferrule 52, or the latter may occur simultaneously. That is, the ferrule push 58 may be used to push the pin keeper 98 against the back of the ferrule 52. Either approach results in the guide pins 56 being pushed through the pin holes 100 in the ferrule 52 until portions of the guide pins 56 project beyond the end face 54. In the embodiment shown, the ferrule push 58 includes front stops 126 (or "bumpers 126") that extend past the pin keeper 98 to directly contact the back of the ferrule 52. Thus, although the pin keeper 98 may be sandwiched between the ferrule 52 and the ferrule push 58, there is still at least some direct contact between the ferrule 52 and the ferrule push 58. The presence of the front stops 126 ensures that the ferrule push 58 still registers to the back of the ferrule 52 regardless of whether a guide pin assembly 96 is present or absent (as is the case for female configurations of the ferrule 52). The ferrule push 58 in the embodiment shown also includes guide pin slots 128 on the sides of the front portion 124 to accommodate portions of the guide pins 56 located behind the pin keeper 98.

Unlike a connector housing, the ferrule push 58 does not extend past a shoulder/flange 132 on the ferrule 52 that defines or is proximate to the back of the ferrule 52. The ferrule push 58 does not extend over the ferrule 52 at all in some embodiments, with the front stops 126 simply contacting the back of the ferrule 52. Indeed, another advantage of the design in the embodiment shown is that the ferrule push 58 may have the same or substantially the same cross-sectional footprint as the ferrule 52. The term "footprint" as used in this disclosure refers to only height, only width, or both height and width of the component in question (e.g., the ferrule 52 and/or the ferrule push 58) when viewed in a cross-sectional plane that is perpendicular to a longitudinal axis of the component. FIG. 10 illustrates how the front portion 124 of the ferrule push 58 has a footprint that generally matches the back of the ferrule 52. The polarity key 118 on the top of the ferrule push 58, along with the rear flanges 130 on sides of the ferrule push 58, may protrude no further than or only slightly further than the footprint defined by the shoulder/flange 132 of the ferrule 52. By having a footprint that is substantially the same or less than that of the ferrule 52, the ferrule push 58 may be installed on the ribbons 28 of the trunk cable 20 without increasing (or at least without substantially increasing) the footprint beyond increases resulting from installation of the ferrules 52. As a specific example, the ferrule push 58 may have a maximum height and maximum width that is less than 20%, less than 15%, or even less than 10%, larger than the maximum height and maximum width of the ferrule 52, when viewed in cross-sectional plane perpendicular to a longitudinal axis of the ferrule 52. While the length of the ferrule push 58 is shown larger than a length of the ferrule 52, this is not a requirement, as the ferrule push 58 may have the same length or a smaller length than the ferrule 52.

The ferrule 52, the pin keeper 98 (if present), and the ferrule push 58 may be secured together using an adhesive. Alternatively or additionally, the dust cap 110 may be used to retain the components together. The dust cap 110 has an interior space 140 that accommodates the ferrule 52, the guide pin assembly 96 (including the portions of the guide pins 56 that project from the end face 54), the front portion 124 of the ferrule push 58, and an adjacent portion of the ferrule push 58 that includes the openings 120 and the polarity key 118. Thus, as shown in FIGS. 10 and 11, the ferrule push 58, the guide pin assembly 96, and the aforementioned portions of the ferrule push 58 may be inserted into the dust cap 110. Or, stated differently, the dust cap 110 may be received over the ferrule 52, the guide pin assembly 96, and the aforementioned portions of the ferrule push 58. In the embodiment shown, the ferrule push latches 74 reside in cutouts 144 on opposed sides of the dust cap 110 when the dust cap 110 is installed. Thus, in the embodiment shown, the dust cap 110 does not contact or cover the ferrule push latches 74.

To accommodate the polarity key 118 without a substantial increase in footprint, a top surface of the dust cap 110 includes a window 150 in which the polarity key 118 resides when the dust cap 110 is installed. The portion of the dust cap 110 adjacent (and defining) a back edge of the window 150 may be considered as a crossbar 152, and may include features to assist with travel over the polarity key 118 during installation of the dust cap 110. For example, as shown in FIG. 11A, the crossbar 152 may include a ramped or inclined surface 154 facing the interior of the dust cap 110 (note: FIG. 11A is merely schematic, with structural details within some elements omitted or simplified). The polarity key 118 may also include features to assist with the dust cap 110 traveling over the polarity key 118 during removal of the dust cap 110. For example, as shown in FIG. 11A a rearward-facing surface 156 of the polarity key 118 may be ramped or inclined to make it easier for a forward-facing surface of the crossbar 152 to slide back over the polarity key 118. It will be appreciated that this embodiment is merely an example, and that other embodiments may not include features on the dust cap 110 and/or the polarity key 118 to assist with travel of the dust cap 110 over the polarity key 118.

Referring back to FIG. 10, a window 150 may also be provided on a bottom surface of the dust cap 110 so that the dust cap 110 can be installed in different orientations. It therefore does not matter whether the top surface or the bottom surface is aligned with the polarity key 118 when installing the dust cap 110. The discussion above about features to assist with the dust cap 110 sliding over the polarity key 118 apply equally to the bottom surface, which may have the same features as the top surface.

As can be seen in FIGS. 10 and 11, the dust cap 110 may have a low profile; one that does not substantially increase the cross-sectional footprint of a sub-assembly 168 that comprises the ferrule 52 and the ferrule push 58. For example, in some embodiments, the dust cap 110 may have a maximum height and maximum width that is less than 15%, or even less than 10%, larger than the maximum height and maximum width of the ferrule 52, when viewed in cross-sectional plane perpendicular to a longitudinal axis of the ferrule 52. By having a footprint that is only slightly larger than the ferrule 52, a dust cap 110 may be installed on each of the ferrules 52 of the pre-terminated trunk cable 80 (FIG. 7) without substantially increasing the overall footprint of the pre-terminated trunk cable 80. This may allow the pre-terminated trunk cable to still fit within a desired sized of a pulling grip (and, therefore, desired sizes of ducts for the pulling grip). Thus, the dust caps 110 may be used not only to protect the ferrules 52 from dust, debris, and other contaminants in a conventional manner (e.g., during storage), but also to provide mechanical protection within a pulling grip during installation, when the ferrules 52 might otherwise be subject to scratches or the like (e.g., from contacting other ferrules or portions of the pulling grip) when being pulled through ducts. Additionally, as mentioned above, the dust cap 110 may assist in keeping the ferrule 52, the guide pin assembly 96, and the ferrule push 58 assembled together (as the sub-assembly 168), instead of or in addition to using adhesive, tape, or some other means of retaining the components together.

FIG. 12 illustrates the pre-terminated trunk cable 80 on a reel 170 and an example of a pulling grip assembly 172 (also referred to as "pulling grip 172" or "pulling sock 170") installed over an end portion of the pre-terminated trunk cable 80 (e.g., the end portion 82 represented in FIG. 7). The pulling grip 172 covers all of the ferrules 52, the ferrule push components 58, and the dust caps 110 associated with the end portion 82. It has already been mentioned how the staggering of the ferrules 52, the design of the ferrule push components 58, and the design of the dust caps 110 can help minimize the footprint of the pulling grip 172. For a given pulling grip design, the maximum width/diameter can be less than what it would need to be to accommodate the trunk cable 20 being pre-terminated with assemblies considered to be optical connectors. Additional details of the pulling grip 172 need not be discussed for the purpose of this disclosure. FIG. 12 is merely provided for context to show how the pre-terminated trunk cable 80 may be delivered to an intended site of installation, such as the data center 10 (FIG. 3). At the site of installation, the pre-terminated trunk cable 80 is ultimately installed and used as part of an interconnect system. An example installation of such an interconnect system for the data center will now be described.

Example Installation and Interconnect System

Figure 13:
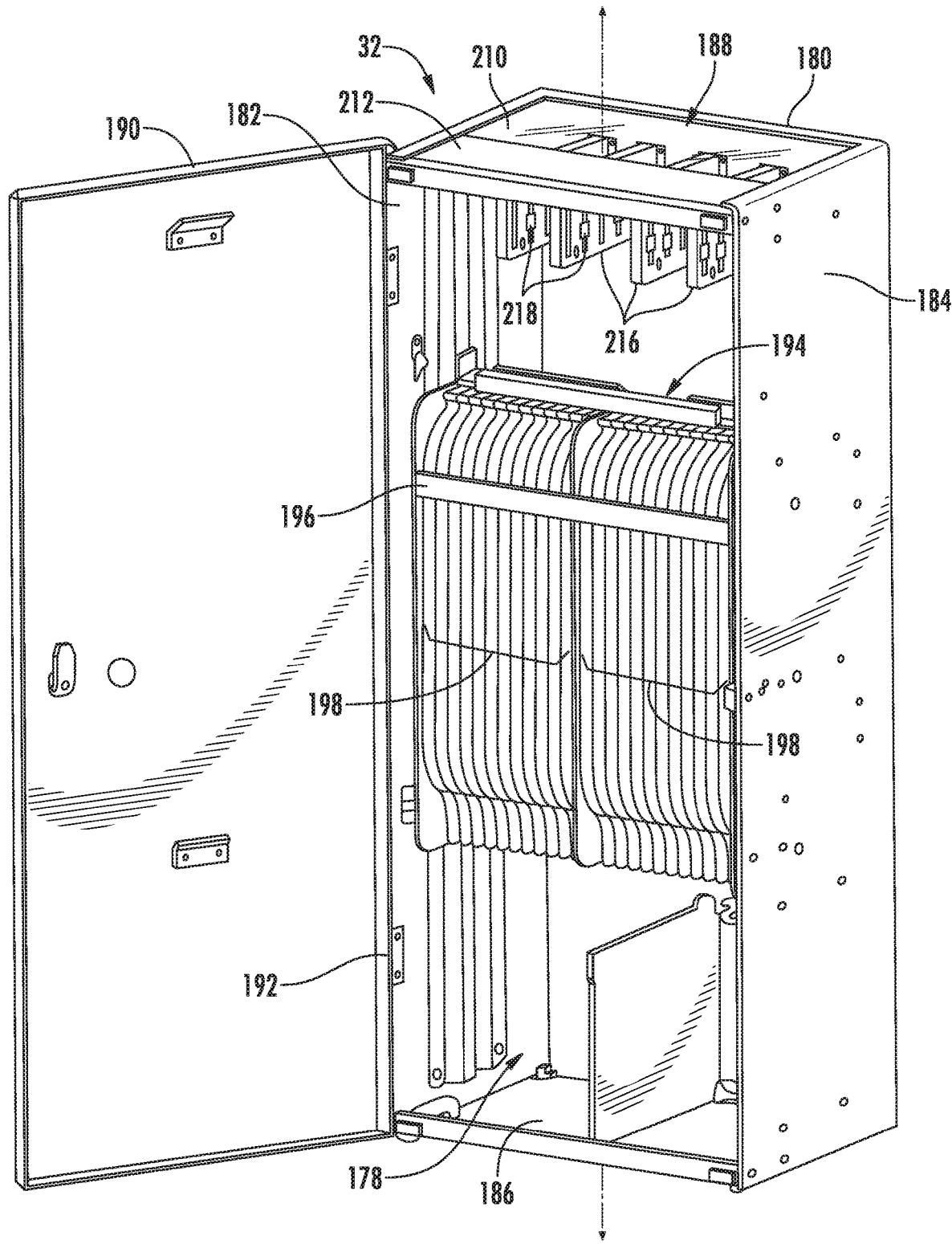
FIG. 13 is a perspective view of one example of a distribution cabinet used in the data center campus of FIG. 4.

FIG. 13 illustrates one possible embodiment for the distribution cabinets 32 mentioned above in connection with FIG. 4. The distribution cabinet 32 may be similar to embodiments described in PCT Patent Application Publication Nos. WO 2019/079460 A1 ("the '460 publication") and WO 2019/079425 A1 ("the '425 publication"), the disclosures of which of fully incorporated herein by reference. Indeed, the FIG. 13 generally corresponds to FIG. 1 of the '425 publication such that reference can be made to the '425 publication for a more complete understanding of aspects not discussed below. Only a brief overview is provided below before focusing on differences from the '425 publication that are specific to this disclosure.

As shown in FIG. 13, the distribution cabinet 32 includes various walls that are assembled together to define an interior volume 178. In particular, the distribution cabinet 32 includes a rear wall 180, a first side wall 182 and a second side wall 184 coupled to opposite sides of the rear wall 180, and a lower wall 186 and an upper wall 188 respectively coupled to a top and bottom of each of the rear wall 180, the first side wall 182, and the second side wall 184. A front door 190 is pivotally coupled to the first side wall 182 (e.g., by hinges 192) to provide selective access to the interior volume 178. The distribution cabinet 32 also includes a tray assembly 194 within the interior volume 178 that comprises a tray housing 196 pivotally coupled to the distribution cabinet 32 and a plurality of trays 198 coupled to the tray housing 196. The tray housing 196 may pivot/rotate outward from the interior volume 178 to facilitate access to the trays 198. The trays 198 themselves may pivot or otherwise move relative to the tray housing 196 (including being removable from the tray housing 196) to provide additional access to any given tray 198.

The '425 publication refers to the trays 198 as "splice trays" because they are intended to store fusion splice joints between the optical fibers of two different cables. Because the present disclosure relates to pre-terminated cables rather than ones that require splicing, the more generic term "tray" is used. The trays 198 are still intended to store joints between the optical fibers of two different cables, but the joints are in the form optical connectors mated (i.e., coupled) together using respective adapters. The trays 198 may therefore be referred to as "adapter trays 198" or "patch trays 198" and the distribution cabinet 32 as a "patch cabinet 32" or "patch enclosure 32".

Figure 14:
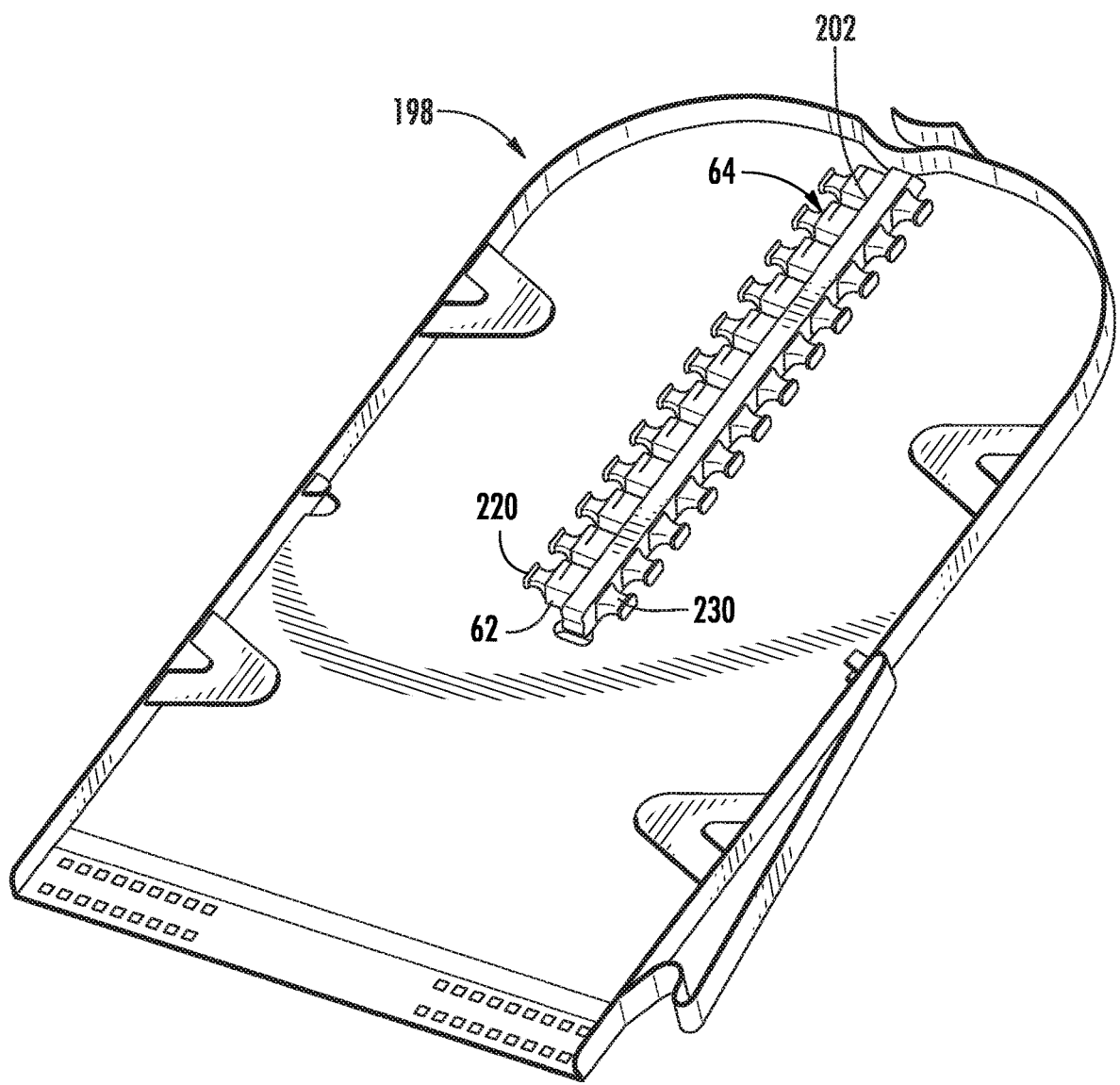
FIG. 14 is a perspective view of one example of a tray that is used to store optical connections in the distribution cabinet of FIG. 13, wherein the tray includes adapter assemblies like what is shown in FIGS. 1-3.

FIG. 14 illustrates a possible embodiment for a representative one of the trays 198. As shown in FIG. 14, the tray 198 includes a series or bank of the adapters 60 coupled to the tray 198. Any common grouping and mounting of adapters may be considered as an adapter panel for the purpose of this disclosure. In the embodiment of FIG. 14, the adapters 60 are commonly mounted in a support 202 that, in turn, is mounted to the tray 198. The support 202 with the adapters 60 may be considered as an adapter panel, or more generally the tray 198 assembled with the adapters 60 may be considered as an adapter panel. Indeed, in alternative embodiments, the adapters 60 may be mounted to the tray 198 individually instead of by way of a common support. Embodiments of "ganged" adapters mounted to the tray 198 are also possible. Each of the adapters 60 includes a respective connector housing 62 pre-installed on one side, as discussed above in connection with FIGS. 1-3, thereby forming respective adapter assemblies 64 that are pre-populated with respective connector housings 62 that are not intended to be removed.

Now referring collectively to FIGS. 4 and 12-14, the pre-terminated trunk cable 80 may be routed from one building (main building 12 or auxiliary building 14) to another in the data center 10. This may involve using the pulling grip 172 to pull the pre-terminated trunk cable 80 through ducts that extend into and out of the buildings, and possibly between the buildings. Ultimately the end portion 82 that includes the pulling grip 172 may be routed into the interior volume 178 of the distribution cabinet 32. Various features may be provided in the distribution cabinet 32 to assist with receiving the pre-terminated trunk cable 80. Although FIG. 13 illustrates a transparent rear plate 210 without openings as a rear portion of the upper wall 188, such a plate may include different sized openings for different types of cables. For example, there may be openings sized to receive the larger, high fiber-count pre-terminated trunk cables 80, and openings sized to receive the relative smaller fiber-count indoor cables 34. A front plate 212 defining a front portion of the upper wall 188 may also be removable to assist with accessing the pre-terminated trunk cable 80 and other cables as they are routed into the distribution cabinet 32 (e.g., through the openings in the rear plate 210, if present). Additionally, the distribution cabinet 32 may include brackets 216 below the rear plate 210 that serve as mounting locations for the pre-terminated trunk cable 80 and other cables. Apertures 218 or other mounting features may be provided on the brackets 216 for cooperating with complementary mounting features of clips (not shown), which may be integral with the cables (e.g., part of the furcation body 84) or mounted to the cables.

Ultimately the pulling grip 172 is removed from the pre-terminated trunk cable 80 to expose the end sections 88 (FIG. 5) of the subunits 22. This may be done before or after securing the pre-terminated trunk cable 80 to the brackets 216. Regardless, having routed the end portion 82 into the distribution cabinet 32 using the pulling grip 172, the end sections 88 of the subunits 22 are positioned close the trays 198. This may help minimize the amount of further routing or handling of the pre-terminated trunk cable 80 after the pulling grip 172 is removed, thereby reducing the potential for damage that results from sections of the ribbons 28 now being exposed (the end portions of the optical fibers 24 that extend from the associated subunit jackets 26).

The connection of each subunit 22 of the pre-terminated trunk cable 80 to the corresponding indoor cable 34 generally takes place in a corresponding one of the trays 198. For example, FIG. 14 may represent the tray 198 associated with the connection between one of the subunits 22 and a corresponding indoor cable 34. When it is desired to make that connection, the tray 198 is accessed from the tray assembly 194. Both the pre-terminated sub-assemblies 84 of the subunit 22 (the sub-assemblies that each comprise one or more ribbons 28 having a ferrule 52 and a ferrule push 58) and the adapters 60 are then prepared for coupling. For each pre-terminated sub-assembly 84, this involves removing the dust cap 110 from the ferrule 52 and the ferrule push 58. As shown in FIGS. 15 and 16, there may be a dust cover 220 (sometimes referred as "dust plug") that has been pre-installed in the corresponding connector housing 62. This may be done at the time of assembling the connector housing 62 with the adapter 60 to prevent dust, debris, and other sources of contamination from entering the connector housing 62 and the adapter 60 prior to use. Like conventional dust plugs for adapters, the dust cover 220 may simply be removed by pulling it out of the component in which it is received (the connector housing 62 in the case of the dust cover 220), as shown in FIG. 16.

Once the dust cap 110 and the dust cover 220 have been removed from the pre-terminated sub-assembly 84 and the associated adapter assembly 64, the ferrule push 58 may be used to insert the ferrule 52 into the connector housing 62. As mentioned above in connection with FIGS. 1-3, the ferrule 52 may be advanced until its end face 54 protrudes slightly from the end of the connector housing 62 within the adapter 60. Geometric features within the connector housing 62 ultimately limit travel of the ferrule 52 in the direction of insertion. The connector housing 62 may also engage and retain a portion of the ferrule push 58 in the end of the connector housing 62 that is outside the adapter 60. With the ferrule 52 now retained with the connector housing 62, the resulting assembly has the minimum attributes of an optical connector—an element for optical alignment (the ferrule 52) and an element for mechanical retention (the connector housing 62 and its mechanical reference datum(s)). In other words, the optical connector 50 can now be considered as having been formed. At the same time, installation of this optical connector 50 in the adapter 60 is complete, as the optical connector 50 is ready for coupling with another MPO connector in the adapter 60.

The process described above may be repeated for each of the pre-terminated sub-assemblies 84 associated with the subunit 22 and the corresponding adapter assemblies 64 on the tray 198. Connections to the corresponding indoor cable 34 may be done at the same time (e.g., if the indoor cable 34 is already coupled to the adapters 60) or later. In other words, the order of these steps may vary. A subunit 22 of the pre-terminated trunk cable 80 may be coupled to the adapters 60 of the corresponding tray 198 prior to the corresponding indoor cable 34 being coupled to the adapters 60, or vice-versa.

Regardless of the timing, the indoor cable 34 may be routed into the distribution cabinet 32 in a manner similar to the pre-terminated trunk cable 80. Before or after securing the indoor cable 34 to the distribution cabinet 32, optical connectors (not shown) that have been pre-installed on the indoor cable 34 are coupled to the corresponding adapters 60 on the tray 198. The adapters 60 may each have a dust cover 220 pre-installed on the side intended to receive the optical connectors of the indoor cable 34. Thus, if present, the dust covers 220 are removed prior to coupling the optical connectors to the corresponding adapters 60.

Once the optical connectors associated with the subunit 22 have been formed (simultaneously with completing their installation in the adapters 60) and the optical connectors of the indoor cable 34 have been coupled to the adapters 60, optical connections between the subunit 22 and the indoor cable 34 have been established. The adapters 60 align and hold the optical connectors together to allow light to travel between the optical fibers 24 of the subunit 22 and the optical fibers 36 of the indoor cable 34. The tray 198 including the adapters 60 may then be moved back to a storage position in the tray housing 196, and the process repeated for a different subunit 22, tray 198, and indoor cable 34.

The are many alternatives and variations that will be appreciated by persons skilled in optical connectivity without departing from the spirit or scope of this disclosure. For example, as mentioned above, any common grouping and mounting of adapters may be considered as an adapter panel for the purpose of this disclosure. Adapter panels may include adapters arranged in a plurality of adapter rows, a plurality of adapter columns, or both a plurality of adapter rows and a plurality of adapter columns. To this end, in some embodiments, the adapter panels may be located in frames or support members other than trays. Also, in some embodiments, each row of the plurality of adapter rows or each column of the plurality of adapter columns includes a sufficient number of the adapters 60 to correspond to the ferrules 52 associated with any of the subunits 22.

For at least this reason, the invention should be construed to include everything within the scope of the appended claims.

What is claimed is:

1. An interconnect system, comprising:
  a pre-terminated cable assembly, comprising:
    a cable jacket;
    a group of optical fibers carried within the cable jacket and extending beyond an end of the cable jacket;
    a ferrule terminating the group of optical fibers; and
    a ferrule push component installed on the group of optical fibers that are terminated by the ferrule;
  an adapter panel including an adapter; and
  a connector housing coupled to the adapter, wherein the connector housing is configured to receive and retain the ferrule and the ferrule push component without being removed from the adapter.

2. The interconnect system of claim 1, wherein:
  the ferrule includes a front end that defines an end face where the group of optical fibers terminate, a back end opposite the front end, and a shoulder between the front end and the back end that defines a maximum height and a maximum width of the ferrule in a cross-sectional plane perpendicular to a longitudinal axis of the ferrule; and
  the ferrule push component has a maximum height and maximum width in a cross-sectional plane perpendicular to a longitudinal axis of the ferrule push that is substantially the same or less than the maximum height and maximum width of the ferrule.

3. The interconnect system of claim 1, wherein the connector housing and the ferrule push component are shaped so that the connector housing is only configured to receive the ferrule push component in a single orientation of the ferrule push component relative to the connector housing.

4. The interconnect system of claim 1, wherein the group of optical fibers includes the optical fibers arranged side-by-side in a predefined order, and wherein the ferrule push component includes a polarity key configured to orient the ferrule push component relative to the predefined order of the group of optical fibers upon which the ferrule push component is installed.

5. The interconnect system of claim 4, wherein the ferrule push component includes at least one opening in at least one side of the ferrule push component, and wherein the predefined order of the group of optical fibers upon which the ferrule push component is installed can be confirmed by viewing the optical fibers through the at least one opening.

6. The interconnect system of claim 1, further comprising:
  a dust cover received in an end of the connector housing that is outside the adapter.

7. The Interconnect system of claim 1, wherein the ferrule is an MT-type ferrule, and wherein an end of the pre-terminated cable assembly that includes the ferrule does not include optical connectors according to any intermatability standard for MPO-type optical connectors.

8. The interconnect system of claim 1, wherein the connector housing and the ferrule are configured to define an optical connector when the connector housing receives and retains the ferrule and the ferrule push component.

9. The interconnect system of claim 8, wherein the connector housing and the ferrule are configured to define an optical connector according to IEC 61754-7-2: 2019 or TIA/EIA 604-5-F: 2019 when the connector housing receives and retains the ferrule and the ferrule push component.

10. The interconnect system of claim 1, wherein the connector housing is releasable from the adapter without a tool.

11. A method of installing the interconnect system, comprising:
  extending a pre-terminated cable assembly into a building, wherein the pre-terminated cable assembly includes a cable jacket, a group of optical fibers carried within the cable jacket and extending beyond an end of the cable jacket, a ferrule terminating the group of optical fibers, and a ferrule push component installed on the group of optical fibers that are terminated by the ferrule;
  routing an end of the pre-terminated cable assembly that includes the ferrule toward an adapter panel that includes an adapter having a first opening on a first side of the adapter and a second opening on a second side of the adapter, and wherein the connector housing is pre-installed on the first side of the adapter; and
  installing the ferrule in adapter by inserting the ferrule push component into the connector housing, wherein the connector housing is coupled to the adapter before the installing step and remain coupled to the adapter during the installing step.

12. The method of claim 11, wherein the installing step results in the ferrule and the connector housing being coupled together to define an optical connector that is installed in the adapter.

13. The method of claim 12, wherein the optical connector is according to IEC 61754-7-2: 2019 or TIA/EIA 604-5-F: 2019.

14. The method of claim 12, wherein the installing step is performed without any tools, and wherein once the installing step is complete, the optical connector is removable from the adapter without any tools.

15. The method of claim 14, wherein the routing step further comprises pulling the pre-terminated cable assembly through a duct using a pulling grip assembly that covers the ferrule and the ferrule push component.

* * * * *